(12) United States Patent
Cheung et al.

(10) Patent No.: US 8,959,136 B1
(45) Date of Patent: Feb. 17, 2015

(54) MATRIX OPERATIONS IN AN INTEGRATED CIRCUIT DEVICE

(75) Inventors: Colman C. Cheung, San Diego, CA (US); Steven Perry, High Wycombe (GB); Volker Mauer, High Wycombe (GB); Mark Jervis, Windsor (GB)

(73) Assignee: Altera Corporation, San Jose, CA (US)

( * ) Notice: Subject to any disclaimer, the term of this patent is extended or adjusted under 35 U.S.C. 154(b) by 366 days.

(21) Appl. No.: 13/466,805

(22) Filed: May 8, 2012

(51) Int. Cl.
 *G06F 17/16* (2006.01)
(52) U.S. Cl.
 USPC .......................................................... 708/607
(58) Field of Classification Search
 None
 See application file for complete search history.

(56) References Cited

U.S. PATENT DOCUMENTS

| | | | |
|---|---|---|---|
| 7,072,929 B2* | 7/2006 | Pechanek et al. | 708/622 |
| 7,680,873 B2* | 3/2010 | Pechanek et al. | 708/622 |
| 8,335,812 B2* | 12/2012 | Pechanek et al. | 708/622 |
| 8,396,914 B1 | 3/2013 | Langhammer | |
| 8,577,951 B1 | 11/2013 | Langhammer | |
| 8,705,646 B1 | 4/2014 | Xu | |
| 2002/0169813 A1* | 11/2002 | Pechanek et al. | 708/622 |
| 2006/0224656 A1* | 10/2006 | Pechanek et al. | 708/622 |
| 2010/0121899 A1* | 5/2010 | Pechanek et al. | 708/521 |
| 2011/0238720 A1 | 9/2011 | Langhammer et al. | |
| 2012/0128376 A1* | 5/2012 | Sun et al. | 398/208 |

OTHER PUBLICATIONS

Demirsoy, S. and Langhammer M., "Fused Datapath Floating Point Implementation of Cholesky Decomposition," High Wycombe: Altera, 2009.

* cited by examiner

*Primary Examiner* — David H Malzahn
(74) *Attorney, Agent, or Firm* — Ropes & Gray LLP

(57) ABSTRACT

Efficient matrix operations circuitry is based on combining a matrix decomposition and a forward substitution operations to share the same processing overhead. A dual multiplier circuit selectively applies complex multiplication operations to a first and second input vectors for computing a conjugate dot product vector or a non-conjugate dot product vector. The conjugate dot product vector corresponds to the matrix decomposition operation for triangulating an input matrix to generate an element of a triangulated matrix. The non-conjugate dot product vector corresponds to a forward substitution operation for determining an element of a forward substitution vector from the triangulated matrix.

18 Claims, 7 Drawing Sheets

$$L = \begin{pmatrix} L_{11} & 0 & 0 & 0 & 0 \\ L_{21} & L_{22} & 0 & 0 & 0 \\ L_{31} & L_{32} & L_{33} & 0 & 0 \\ \cdot & \cdot & \cdot & \cdot & 0 \\ L_{n1} & L_{n2} & L_{n3} & \cdot & L_{nn} \end{pmatrix}$$

FIG. 1

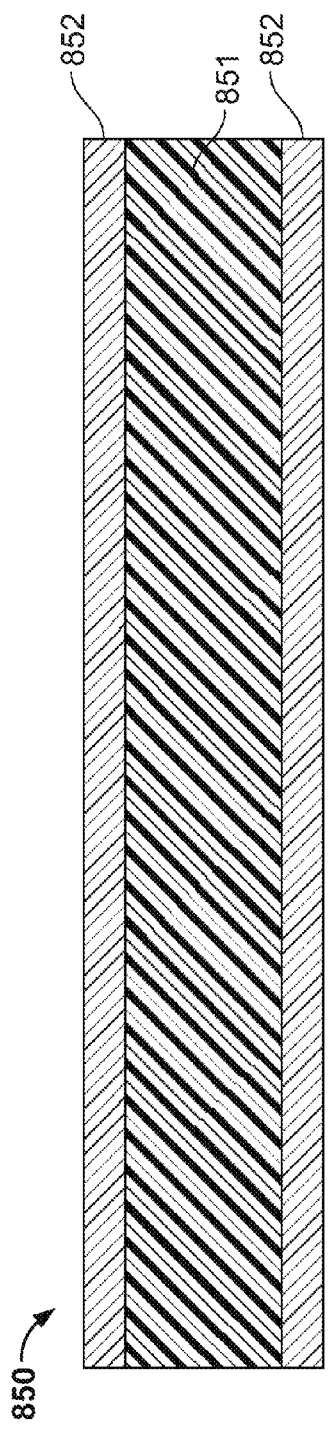
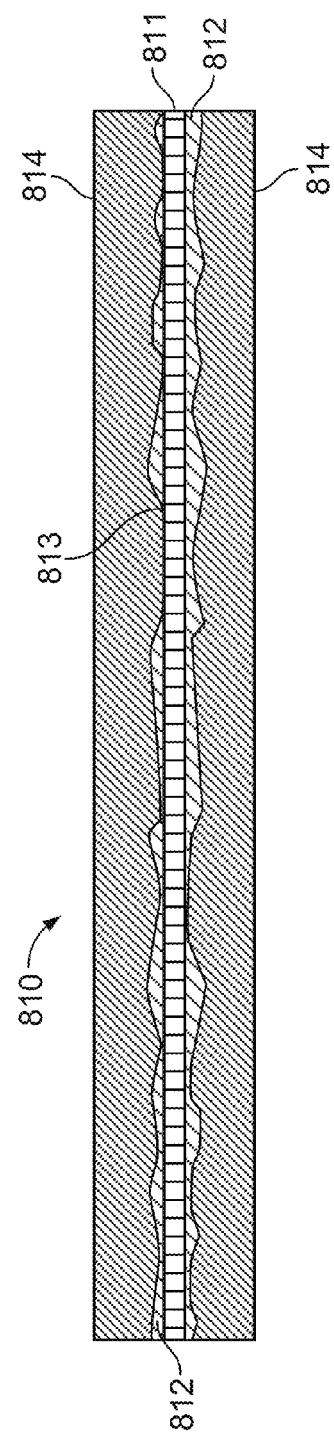

MATRIX OPERATIONS IN AN INTEGRATED CIRCUIT DEVICE

FIELD OF THE INVENTION

This disclosure relates to solving matrix equations in integrated circuit devices, and particularly in programmable integrated circuit devices.

BACKGROUND OF THE INVENTION

Certain linear matrix equations take the form, $$A*x=b, \quad \text{(EQ. 1)}$$

where A and b are known matrices and x is an unknown matrix. To solve these equations, input matrix A may be triangulated into a product of a lower triangular matrix L—i.e., a matrix with zero elements above the diagonal—and its transpose matrix L'. By rewriting EQ. 1 as L*L'*x=b and setting y=L'*x, elements of x can be solved in a two-step process: y is first solved by forward substitution from L*y=b. Then, having determined y and L (and thus L'), a backward substitution operation is applied to compute elements of x from y=L'*x.

Previous linear equation solvers traditionally perform the aforementioned matrix operations as three distinct operations. First, these solvers solve for triangulated matrix L by applying Cholesky decomposition to input matrix A. Second, the solvers solve for y by applying forward substitution to L*y=b. Third, the solvers compute x by applying backward substitution to y=L'*x. Performing these operations separately may impose significant latency and resource usage, which may be problematic, particularly as operations on large matrices become more common.

SUMMARY OF THE INVENTION

This disclosure relates to solving matrix equations in integrated circuit devices, and particularly in programmable integrated circuit devices.

In accordance with some embodiments, there is provided matrix operations circuitry including a multiplier circuit. The multiplier circuit is configured to selectively apply complex multiplication operations to input data for computing one of a conjugate dot product vector or a non-conjugate dot product vector. The conjugate dot product vector corresponds to a matrix decomposition operation for triangulating an input matrix to generate an element of a triangulated matrix. The non-conjugate dot product vector corresponds to a forward substitution operation for determining an element of a forward substitution vector from the triangulated matrix.

A method of configuring such circuitry on a programmable device, and a machine-readable data storage medium encoded with software for performing the method, are also provided.

BRIEF DESCRIPTION OF THE DRAWINGS

Further features will be apparent upon consideration of the following detailed description, taken in conjunction with the accompanying drawings, in which like reference characters refer to like parts throughout, and in which:

FIG. 1 shows an example resultant matrix of a Cholesky decomposition operation;

FIG. 6A is a cross-sectional view of a magnetic data storage medium encoded with a set of machine-executable instructions for performing the method according to some embodiments;

FIG. 6B is a cross-sectional view of an optically readable data storage medium encoded with a set of machine executable instructions for performing the method according to some embodiments.

DETAILED DESCRIPTION OF THE INVENTION

An example 100 of a triangulated n-by-n matrix L resulting from a Cholesky decomposition is shown in FIG. 1. The elements on the diagonal are $L_{11}, \ldots, L_{nn}$. In each $j^{th}$ column (e.g., column 106), the elements under $L_{jj}$ are $L_{ij}$ (i=j+1), $\ldots, L_{nj}$. The matrix may be considered to be empty above the diagonal, or the elements above the diagonal may be considered to be zeroes, as illustrated in example 100. The elements $L_{jj}$ on the diagonal can be obtained using the following equation:

$$L_{jj} = \sqrt{a_{jj} - \sum_{k=1}^{j-1} L_{jk} * conj(L_{jk})} \quad \text{(EQ. 2)}$$

where $a_{jj}$ is the $jj^{th}$ element of the input matrix A, and $L_{jk}$ is the $jk^{th}$ element in the resultant triangulated matrix L. The subsequent elements in the $j^{th}$ column of L may be calculated as:

$$L_{ij} = \frac{a_{ij} - \sum_{k=1}^{j-1} L_{ik} * conj(L_{jk})}{L_{jj}} \quad \text{(EQ. 3)}$$

In a system of equations A*x=b, forward substitution and backward substitution operations may be used to solve for unknown values of vector x. First, forward substitution vector y=L'*x is computed where elements of y are solved from top to bottom, i.e., from $y_1$ to $y_n$ using the following forward substitution equation:

$$y_j = \frac{b_j - \sum_{k=1}^{j-1} y_k * L_{jk}}{L_{jj}}. \quad \text{(EQ. 4)}$$

Having determined elements of forward substitution vector y=L'*x, elements of x are solved from bottom to top, i.e., from $x_n$ to $x_1$ using forward substitution as follows:

$$x_j = \frac{y_j - \sum_{k=j+1}^{n} x_k * L'_{jk}}{L'_{jj}}$$

In the equation above, values of L' are determined from triangulated matrix L. In particular, $L'_{jk}=\text{conj}(L_{kj})$ and $L_{jj}=L'_{jj}$ because diagonal elements are real.

Embodiments of the present disclosure are based on a recognition that the forward substitution operation of EQ. 4 and the Cholesky decomposition operation of EQ. 3 are substantially similar. Both operations have the same denominator and a numerator with a subtraction involving a dot product with a second operand $L_{jk}$. The difference is that the second operand, $L_{jk}$, of the dot product is conjugated in EQ. 3 and is not conjugated in EQ. 4. Building on this similarity, embodiments of the present disclosure allocate shared memory and/or processing overhead for both Cholesky decomposition and forward substitution operations.

Figure 2:
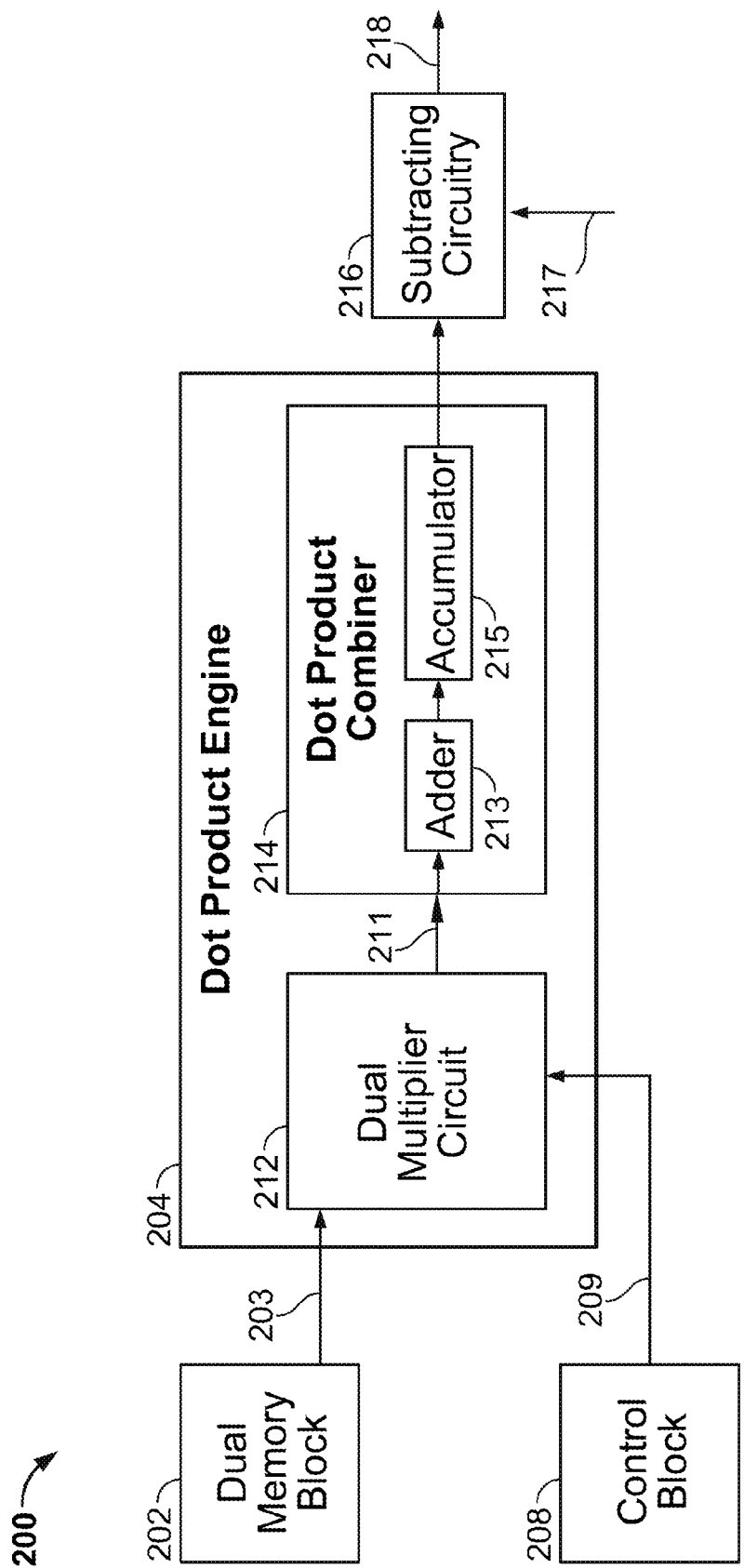
FIG. 2 shows a simplified block diagram of a matrix operations circuitry according to some embodiments.

FIG. 2 shows a simplified block diagram of a matrix operations circuitry 200 according to some embodiments. Matrix operations circuitry 200 includes dual memory block 202, control block 208, dot product engine 204, and subtracting circuitry 216. Dot product engine 204 includes dual multiplier circuit 212 and dot product combiner 214.

Dual memory block 202 stores input matrix A and product resultant matrix b (where product resultant matrix b corresponds to a product of input matrix A and an unknown vector x, e.g., A*x=b). Dual multiplier circuit 212 receives input data 203 from dual memory block 202 and an operation selection signal 209 from control block 208. Based on the polarity of the operation selection signal 209, dual multiplier circuit 212 processes the received input data 203 to generate a dot product vector 211 that is either a conjugate dot product vector or a non-conjugate dot product vector. The conjugate dot product vector corresponds to a matrix decomposition operation for triangulating input matrix A to generate an element $L_{ij}$ of triangulated matrix L. The conjugate dot product vector corresponds to all or a portion of vector $[L_{i1}*\text{conj}(L_{j1}), L_{i2}*\text{conj}(L_{j2}), \ldots, L_{i(j-1)}*\text{conj}(L_{j(j-1)})]$ which contains the elements summed in term $\Sigma_{k=1}^{j-1} L_{ik}*\text{conj}(L_{jk})$ of EQ. 3 above. In contrast, the non-conjugate dot product vector corresponds to a forward substitution operation for determining an element $y_j$ of a forward substitution vector y (where y corresponds to a product of a factor of input matrix A and unknown vector x, e.g., y=L'*x). The non-conjugate dot product vector corresponds to all or a portion of vector $[y_1*L_{j1}, y_2*L_{j2}, \ldots, y_{j-1}*L_{j(j-1)}]$ which contains the elements summed in term $\Sigma_{k=1}^{j-1} y_k*\text{conj}(L_{jk})$ of EQ. 4 above. By controlling dual multiplier circuitry 212 to selectively apply complex matrix operations to the second operand of dual multiplier circuit 212, dot product engine 204 may compute outputs for a matrix decomposition or a forward substitution operations.

In some embodiments, dual memory block 202 stores a composite matrix that comprises a first portion corresponding to input matrix A and a second portion corresponding to product result matrix b, which may be a product of the triangulated matrix L and the forward substitution vector y. Dual multiplier circuit 212 processes the input data 203 received from the first portion of dual memory block 202 to generate the non-conjugate dot product vector and the input data received from the second portion of dual memory block 202 to generate the conjugate dot product vector.

The dual multiplier circuit 212 may compute a dot product vector 211 of any specified size up to a maximum processing width of the dot product engine 204. In some configurations, the dual multiplier circuit 212 may be configured to output a dot product vector containing all operands being summed in dot product term $\Sigma_{k=1}^{j-1} L_{jk}*\text{conj}(L_{jk})$ of EQ. 2 or in dot product term $\Sigma_{k=1}^{j-1} L_{ik}*\text{conj}(L_{jk})$ of EQ. 3. In these configurations, the processing width (hereinafter VectorSize) of the dot product engine 204 may be greater than or equal to the size of the input matrix n. In other configurations, the dual multiplier circuit 212 may be configured to output a dot product vector corresponding to a subset of the operands being summed in terms $\Sigma_{k=1}^{j-1} L_{jk}*\text{conj}(L_{jk})$ of EQ. 2 or $\Sigma_{k=1}^{j-1} L_{ik}*\text{conj}(L_{jk})$ of EQ. 3. In these configurations, the processing width VectorSize of the dot product engine 204 may be smaller than the input matrix size n and/or performance may be increased by processing shorter partial dot products.

Dot product combiner 214 receives the dot product vector 211 output by dual multiplier circuit 212 and combines elements of the dot product vector to compute a dot product value. For example, dot product combiner 214 may include an adder 213 that sums the elements of the dot product vector 211 to generate a scalar dot product value. The scalar value thus output by adder 213 corresponds to all or a portion of dot product term $\Sigma_{k=1}^{j-1} L_{jk}*\text{conj}(L_{jk})$ of EQ. 2, $\Sigma_{k=1}^{j-1} L_{ik}*\text{conj}(L_{jk})$ of EQ. 3, or dot product term $\Sigma_{k=1}^{j-1} y_k*\text{conj}(L_{jk})$ of EQ. 4.

Dot product combiner 214 may also include additional combination circuitry for combining partial dot products. For example, computing an element $L_{12,10}$ of an exemplary triangulated matrix L involves computing dot product $\Sigma_{k=1}^{9} L_{12,k} \cdot L_{10,k}$ as shown in EQ. 3. This computation involves a dot product of a vector of nine elements $[L_{12,1}, \ldots, L_{12,9}]$ from row 12 of triangulated matrix L by a vector of nine elements $[L_{10,1}, \ldots, L_{10,9}]$ from row 10. Rather than computing this quantity as one dot product of two vectors of size nine, smaller dot products may be computed to improve efficiency. In some embodiments, partial dot products of size five may be computed that can be iterated multiple times to complete a longer dot product. For example, a first partial dot product may be computed between the first five elements of rows 10 and 12 (i.e., between vector portions $[L_{12,1}, \ldots, L_{12,5}]$ and $[L_{10,1}, \ldots, L_{10,5}]$). A second partial dot product may be computed between the next four elements of rows 10 and 12 (i.e., between vector portions $[L_{12,6}, \ldots, L_{12,9}]$ and $[L_{10,6}, \ldots, L_{10,9}]$). The two partial dot products may be summed together to compute the complete dot product $\Sigma_{k=1}^{9} L_{12,k} \cdot L_{10,k}$. This combination of partial dot products may increase efficiency and avoid processing a large number of zeros contained in the resultant matrix L.

In general, in embodiments where partial dot products are combined as described in the above paragraph, dot product combiner 214 may include an accumulator 215 coupled to the output of the adder 213 for combining a first dot product value output from adder 213 with a second dot product value (e.g., previously computed by adder 213 or computed in parallel or in sequence by any other appropriate adder circuitry). The first dot product value may correspond to a first portion of a row of the triangulated matrix L and the second dot product value may correspond to a second portion of the row of the triangulated matrix L that may be adjacent to the first portion. The dot product combiner 214 thus outputs an updated dot product value that corresponds to the first and second portions of the row of the triangulated matrix.

Subtracting circuitry 216 receives the dot product value from the dot product engine 204. Subtracting circuitry 216 subtracts the received dot product value either from an element $a_{ij}$ of the input matrix A (e.g., as described in EQ. 3) or from an element $b_j$ of the product result matrix b (as described in EQ. 4). In some embodiments, subtracting circuitry 216 receives a control signal 217 (e.g., similar to operation selection signal 209 from control block 208) for determining which subtraction operand to process.

The difference 218 output from subtracting circuitry 216 may be further divided by diagonal element $L_{ij}$ to output an element $L_{ij}$ of the triangulated matrix L or an element $b_j$ of product result matrix b, as seen in equations 3 and 4, respectively. Rather than implementing this division using a divider, values $1/L_{ij}$ may be computed and multiplied with output 218. Such an implementation may reduce latency and resource usage and improve precision of calculations.

Figure 3:
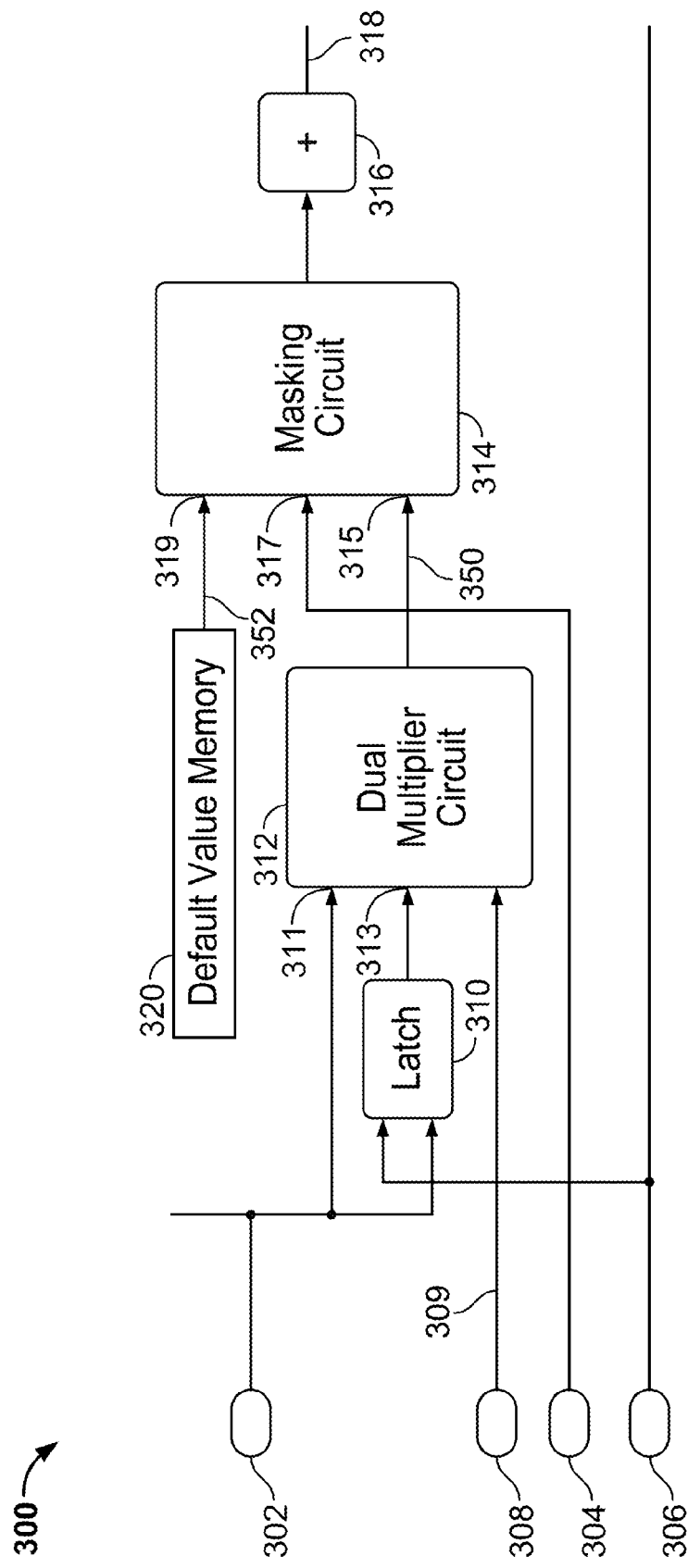
FIG. 3 shows an example of a dot product engine according to some embodiments.

FIG. 3 shows an example of a dot product engine 300 implementing matrix operations circuitry according to some embodiments. For example, dot product engine 300 may correspond to a possible implementation of dot product engine 204 of FIG. 2 above. Dot product engine 300 includes latch 310, dual multiplier circuit 312, masking circuit 314, memory 320, and summer 316.

Dot product engine 300 has a data input 302. In some embodiments, data input 302 receives a plurality of signals corresponding to respective (possibly complex) input elements $a_{ij}$. For example, multiple elements $a_{ij}$ may be input at data input 302, in sequence or in parallel as appropriate. Each data input signal may represent input data using any appropriate number representation, for example, single or double precision, real or complex, and/or floating point type signal. The number of these input lines processed in parallel by dot product engine 300 may be optimized for efficiency and performance and may be programmable based on the input matrix size n and/or a maximum processing width of dot product engine 300.

The data input 302 provides vectored data for dot product processing and is connected to both input ports 311 and 313 of a vector multiplier (dual multiplier circuit 312), one through zero-latency latch 310. Dual multiplier circuit 312 computes conjugate dot product vector $[L_{j1}*conj(L_{j1}), L_{j2}*conj(L_{j2}), \ldots, L_{j(j-1)}*conj(L_{j(j-1)})]$ to determine diagonal element $L_{jj}$ as defined in EQ. 2. The row vector of the triangulated matrix L ending at diagonal element $L_{jj}$, i.e., $[L_{j1}, L_{j2}, \ldots, L_{jj}]$ may be latched for use when solving the non-diagonal elements $L_{ij}$, i.e., as defined in EQ. 3. This row vector ending at $L_{jj}$ will be referred to herein as a diagonal row vector $L_j*$. The latched diagonal row vector $L_j*$ is output at port 313 and used for computing the dot product vector for elements of the $j^{th}$ column of triangulated matrix L. This is because diagonal row vector $L_j*$ corresponds to elements $L_{jk}$ (k=1, ..., j−1) in the conjugate dot product $\Sigma_{k=1}^{j-1} L_{ik}*conj(L_{jk})$ for computing $L_{ij}$. The data vector input at port 311 corresponds to elements $L_{ik}$ (k=1, ..., j−1) in the same conjugate product for computing $L_{ij}$.

Dot product engine 300 has a diagonal row control input 306 for controlling the operation of latch 310. In some embodiments, control input 306 is a Boolean that is set to, e.g., '1' when all elements of the $j^{th}$ column of triangulated matrix L have been processed. Although latch 310 is described as a zero-delay latch, it should be understood that any suitable memory circuitry may be used. For example, circuit 310 may be implemented using memory with any suitable delay or any type such as a circular memory or a queue.

For forward substitution, the dot product vector from EQ. 4, $\Sigma_{k=1}^{j-1} y_k*L_{jk}$, does not require a conjugate multiplication, and therefore the dual multiplier circuit 312 is controlled to output a multiplier without conjugating the second operand. In this case, dual multiplier circuit 312 still receives the latched diagonal row vector at port 313 corresponding to elements $L_{jk}$ (k=1, ..., j−1). Dual multiplier circuit 312 also receives previously computed elements $y_j$ of forward substitution vector y at port 311.

The control input 308 receives operation selection signal 309 for controlling whether the dual multiplier circuit 312 outputs a conjugate or a non-conjugate dot product vector 350. In some embodiments, this operation selection signal 309 is a Boolean value that is set to, e.g., '1' when the dot product engine 300 has finished processing the last row of input matrix A.

Masking circuit 314 allows to selectively mask certain elements from the dot product vector 350 output by dual multiplier circuit 312. This allows dot product engine 300 to compute a dot product vector of any size up to the maximum supported processing width VectorSize. Masking circuitry 314 has a data input port 315 for receiving the dot product vector 350 output from the dual multiplier circuit 312 (where the output dot product vector 350 corresponds to either the conjugate dot product vector or the non-conjugate dot product vector as described above). Masking circuitry 314 has a select control port 317 for receiving a vector of range control signals 304. Furthermore, masking circuitry 314 has a default-values input port 319 for receiving a mask vector 352 of mask or default values. Mask values may be stored in default-value memory 320 as a vector of VectorSize zeros. Each of ports 315, 317, and/or 319 may support data vectors.

The masking circuit 314 is configured to generate a masked dot product vector with a selectable portion of the dot product vector 350 and a selectable portion of the mask vector 352. This is useful because dual multiplier circuit 312 may be configured to output a dot product vector of size VectorSize, where only some values are valid during a given iteration. For example, in an exemplary embodiment where VectorSize=64, dot product engine 300 may be computing elements of column 33 of triangulated matrix L during a given iteration. For this computation, the Cholesky decomposition operation of EQ. 3 has a dot product vector of length 32. In this case, dual multiplier vector may still output a dot product vector 350 of size 64 although only the first 32 elements of that vector are valid. In order to set invalid elements of the dot product vector 350 to zero, the vector of range control signals input at control port 317 may be set to 32 ones followed by 32 zeros. This causes the masking circuit 314 to output the first 32 values in the dot product vector 350 (i.e., the valid values), and set elements that do not exist in the current element computation to zero. In some embodiments, masking circuit 314 may be implemented using a number of multiplexers equal to VectorSize, each multiplexer configured to output either a default value or an element of the vector 350 output from dual multiplier circuit 312. In some embodiments, control signal vector 304 is generated with control circuitry that determines the range of the input matrix vector for which a dot product is being computed at a given iteration.

Summer 316 combines the elements of the dot product vector received from masking circuit 314 to compute a scalar dot product value 318. For example, summer 316 may be implemented as an adder tree. In some embodiments, the matrix is smaller than the processing width supported by dot product engine 300, and the dot product calculation is done using one iteration. In other embodiments, the matrix is larger than the processing width, so another partial dot product value may be computed for a next portion of a vector of input matrix A and the computed partial dot product scalar values are combined to produce an updated dot product value. A floating-point accumulator coupled to the output of summer 316 may be used for this purpose.

Figure 4:
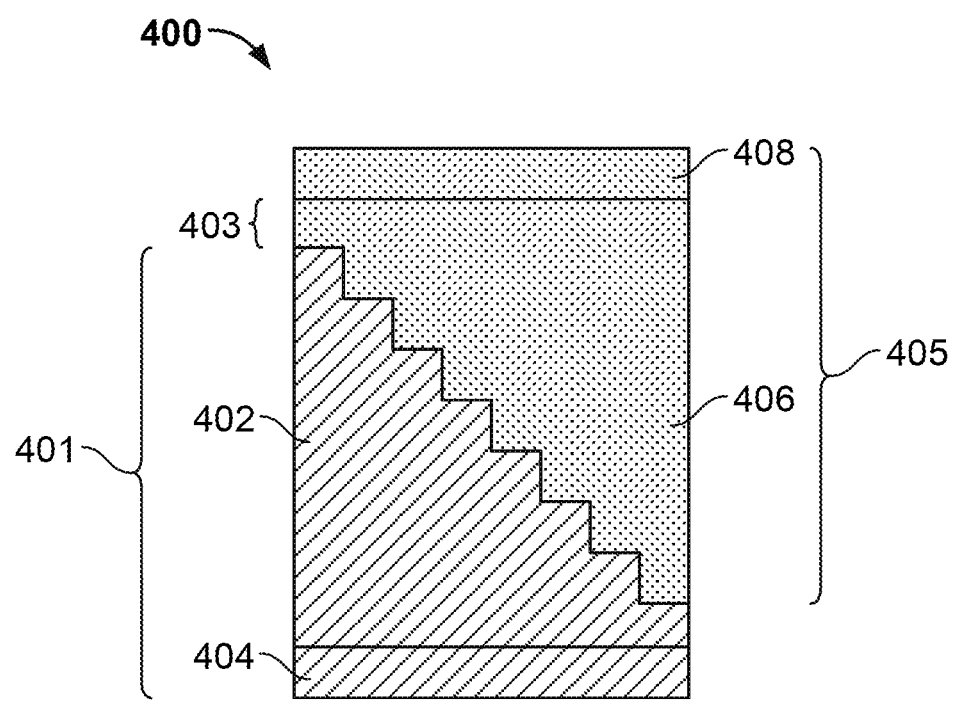
FIG. 4 shows a simplified block diagram of a matrix memory organization according to some embodiments.

FIG. 4 shows a simplified block diagram of a matrix memory organization 400 according to some embodiments. This memory organization may be used, for example, in dual memory block 202 of FIG. 2 above. Matrix memory organization 400 corresponds to a rectangular memory with a lower triangular section 401 and an upper triangular section 405.

From Cholesky decomposition equations 2 and 3, it can be seen that the Cholesky decomposition process effectively operates on the lower triangular portion of input matrix A. Thus, the lower triangular section 401 of a two-dimensional n-by-n memory is sufficient to store elements of input matrix A. To utilize both lower and upper triangular sections of a two-dimensional memory, the square memory is extended row-wise (e.g., by adding row 403) in order to fit lower triangular portions of two different input matrices A and $A_{new1}$.

Lower triangular section 401 includes matrix portion 402 and extension portion 404. To combine the Cholesky decomposition and the forward substitution operations as described above, input matrix A may be loaded into the lower triangular section 401 of the memory and the transpose of the product resultant matrix b may be appended at the bottom of input matrix A and treated as an extension of input matrix A. The resulting composite triangular matrix of portions 402 and 404 may be processed by the same resources, e.g., dot product engine 204 of FIG. 2 and/or dot product engine 300 of FIG. 3. In the illustrated embodiment, at the start of the Cholesky decomposition operation, matrix portion 402 includes elements of input matrix A and extension portion 404 includes elements of product resultant matrix b (where A*x=b). As elements of the triangulated matrix L are computed, elements $a_{ij}$ of input matrix A may be overwritten with corresponding $L_{ij}$ elements in matrix portion 402. Similarly, computed values $y_j$ of the forward substitution vector y may replace values $b'_j$ of the transpose of the product resultant matrix b in the extension portion 404.

The upper triangular section 405 of rectangular memory organization 400 can serve as a double buffer. This is accomplished by reading another input matrix $A_{new1}$ into portion 406 and another product resultant matrix $b_{new1}$ into portion 408 during the time that input matrix A and/or product resultant matrix b are being processed in the lower triangular section 401. In this way, when processing of the input matrix A is finished in lower triangular section 401, matrix decomposition may be applied to input matrix $A_{new1}$ without additional delay. While input matrix $A_{new1}$ is being processed, another new matrix $A_{new2}$ may be loaded in lower triangular section 401 and so on.

In the illustrated example, the memory is extended row-wise to fit two different input matrices and to add product resultant matrix b and buffered product resultant matrix $b_{new1}$, therefore the depth of the memory is three more than the width of the memory. For example, a memory depth of 11 and width 8 may be used to process two 8-by-8 matrices. By extending one dimension of the memory, this memory organization allows double buffering and improves throughput while reducing memory usage.

Although FIG. 4 illustrates an organization of a rectangular memory, this two-dimensional use of memory is only illustrative and is not meant to be exhaustive. In some embodiments, a single-dimension memory that emulates the two-dimensional memory 400 by linearizing the length or width dimensions may be used. Furthermore, any other appropriate memory organization may be used. Also, although the width of the illustrated memory corresponds to the size of the input matrix, this is not meant to be limiting. For example, other dimensions may be used as appropriate without departing from the scope of the disclosure.

Figure 5:
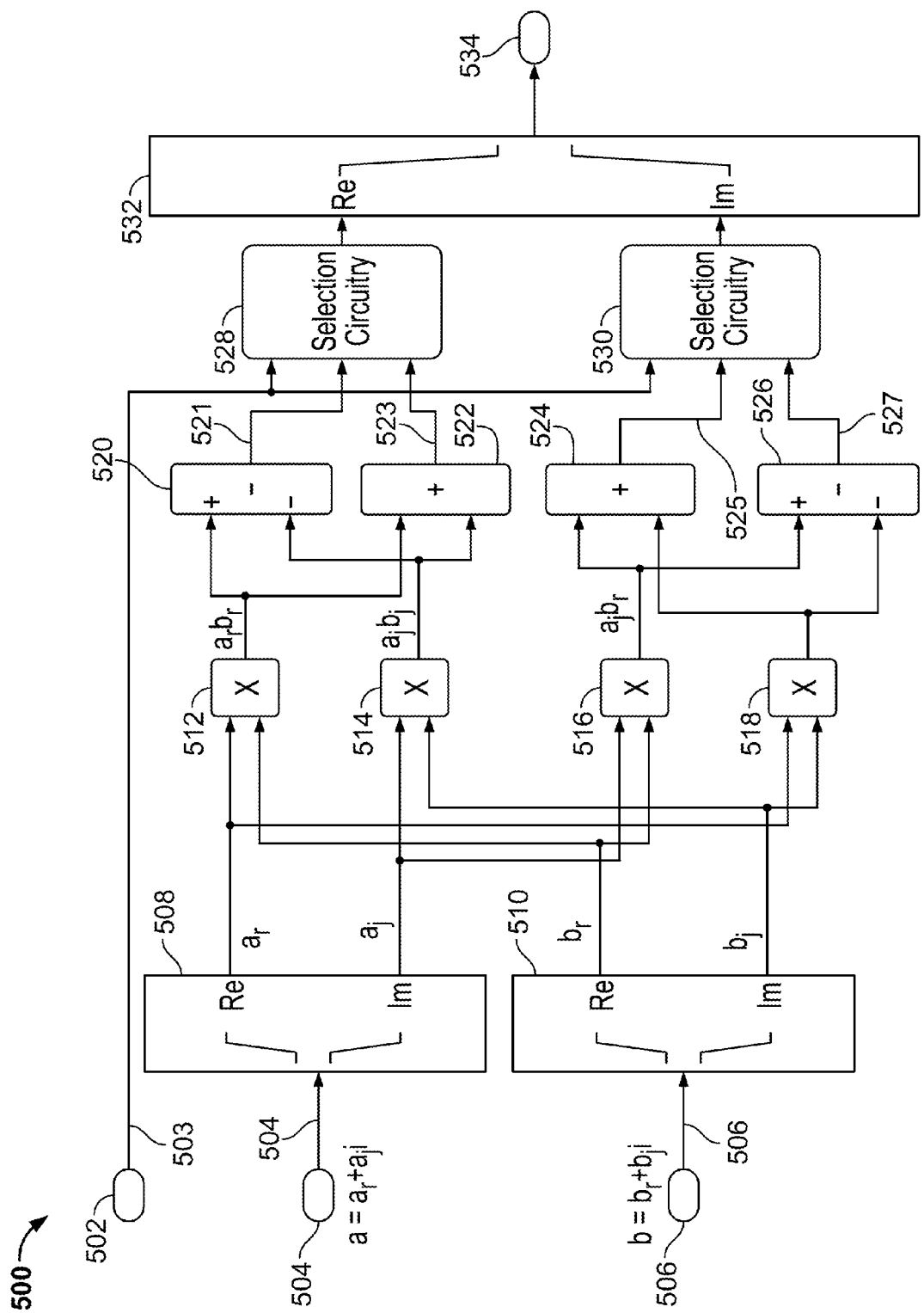
FIG. 5 shows an example of a circuit structure implementing multiplier circuitry of matrix operations circuitry according to some embodiments.

FIG. 5 shows an example of a circuit structure 500 implementing multiplier circuitry of matrix operations circuitry according to some embodiments. Circuit structure 500 may be implemented inside dual multiplier circuit 212 of FIG. 2 or dual multiplier circuit 312 of FIG. 3. Circuit structure 500 includes registers 508, 510 and 532, multipliers 512, 514, 516, and 518, adders 522 and 524, subtractors 520 and 526, and selection circuitry 528 and 530.

Circuit structure 500 has two data inputs 504 and 506. Data input 504 receives first complex operand a, which includes a real part $a_r$ and an imaginary part $a_j$ (i.e., $a=a_r+a_j i$). Each of the real and imaginary parts may be stored in register 508. Similarly, data input 506 receives a second complex operand b which includes a real part $b_r$ and an imaginary part $b_j$ (i.e., $b=b_r+b_j i$). These parts may be stored in register 510.

Circuit structure 500 has a control signal input 502 for receiving an operation selection signal 503. This operation signal may be similar to operation selection signal 209 of FIG. 2 and/or operation selection signal 309 of FIG. 3. Based on operation signal selector 503, circuit structure 500 selectively computes a conjugate product a*b or non-conjugate product a*conj(b). That is, the operation selection signal 503 determines whether the second operand b is conjugated or not. Details of implementation are further described below and are based on rewriting the non-conjugate product of a and b as follows:

$$a*b=(a_r+a_j i)*(b_r+b_j i)=(a_r*b_r-a*b)+(a_j*b_r+a_r*b_j)i. \quad (EQ. 5)$$

By contrast, the conjugate product of a and b can be rewritten as follows:

$$a*conj(b)=(a_r+a_j i)*(b_r-b_j i)=(a_r*b_r+a_j*b_j)+(a_j*b_r-a_r*b_j)i. \quad (EQ. 6)$$

Each of multipliers 512, 514, 516, and 518 computes a product of a different pair of real and/or imaginary parts $\{a_r, a_j, b_r, b_j\}$. In the illustrated embodiment, multiplier 512 outputs a product of real parts $a_r*b_r$, multiplier 514 outputs a product of imaginary parts $a_j*b_j$, multiplier 516 outputs a product of real and imaginary parts $a_j*b_r$, and multiplier 518 outputs a product of real and imaginary parts $a_r*b_j$.

Subtractor 520 and adder 522 combine products output by multipliers 512 and 514. In the illustrated embodiment, subtractor 520 computes the difference $a_r*b_r-a_j*b_j$ and adder 522 computes the sum $a_r*b_r+a_j*b_j$. Similarly, subtractor 524 and adder 526 combine products output by multipliers 516 and 518. In the illustrated embodiment, subtractor 526 computes the difference $a_j*b_r-a_r*b_j$ and adder 524 computes the sum $a_j*b_r+a_r*b_j$.

Selection circuitry 528 receives each of the difference 521 of products output by subtractor 520 and the sum 523 of products output by adder 522. Selection circuitry 528 outputs one of the difference 521 or sum 523 based on a polarity of the operation selection signal 503. Similarly, selection circuitry 530 receives each of the difference 527 of products output by subtractor 526 and the sum 525 of products output by adder 524. Selection circuitry 530 outputs one of the difference 527 or sum 525 based on the polarity of the operation selection signal 503.

For example, to calculate the non-conjugate product a*b, the operation selection signal 503 may be set to, e.g., '0', which causes the selection circuitry 528 to output the difference 521 of products as the real part of the resultant non-conjugate product. Similarly, the setting of the operation selection signal to '0' may cause the selection circuitry 530 to output the sum 525 of products as the imaginary part of the resultant non-conjugate product. This is consistent with EQ. 5 above.

In contrast, to calculate the conjugate product a*conj(b), the operation selection signal 503 may be set to, e.g., '1', which causes selection circuitry 530 to output the sum 525 of products as the real part of the resultant non-conjugate product and the selection circuitry 530 to output the difference 527 of products as the imaginary part of the resultant non-conjugate product. This is consistent with EQ. 6 above. The real part of the resultant product output by selection circuitry 528 and the imaginary part of the resultant product output by selection circuitry 530 may be stored in register 532 and output at output pin 534.

By setting the value of operation selection signal 503, circuit structure 500 is able to dynamically output a conjugate or non-conjugate product as appropriate. This allows for sharing processing resources between a matrix decomposition operation and forward substitution operations, as described above.

The architecture described above may improve efficiency and reduce latency by decreasing resource consumption, reusing hardware and sharing memory and/or processing resources between matrix decomposition and forward substitution operations. The systems and methods discussed above may be used in floating point implementations to develop high performance data paths for solving matrix equations.

The structures described above may be generated in fixed logic, in which case the sizes of the various computational components may be fixed to a particular application. Alternatively, the fixed logic circuitry could allow for limited parameterization.

One potential use for the systems and methods discussed above may be in programmable integrated circuit devices such as programmable logic devices, where programming software can be provided to allow users to configure a programmable device to perform matrix operations. The result would be that fewer logic resources of the programmable device would be consumed than otherwise. And where the programmable device is provided with a certain number of dedicated blocks for arithmetic functions (to spare the user from having to configure arithmetic functions from general-purpose logic), the number of dedicated blocks needed to be provided (which may be provided at the expense of additional general-purpose logic) can be reduced (or sufficient dedicated blocks for more operations, without further reducing the amount of general-purpose logic, can be provided).

Instructions for carrying out a method according to some embodiments for programming a programmable device to perform matrix operations may be encoded on a machine-readable medium, to be executed by a suitable computer or similar device to implement the method of some embodiments for programming or configuring programmable logic devices (PLDs) or other programmable devices. For example, a personal computer may be equipped with an interface to which a PLD can be connected, and the personal computer can be used by a user to program the PLD using a suitable software tool, such as the QUARTUS® II software available from Altera Corporation, of San Jose, Calif.

FIG. 6A presents a cross section of a magnetic data storage medium 850 which can be encoded with a machine executable program that can be carried out by systems such as the aforementioned personal computer, or other computer or similar device. Medium 850 can be a floppy diskette or hard disk, or magnetic tape, having a suitable substrate 851, which may be conventional, and a suitable coating 852, which may be conventional, on one or both sides, containing magnetic domains (not visible) whose polarity or orientation can be altered magnetically. Except in the case where it is magnetic tape, medium 850 may also have an opening (not shown) for receiving the spindle of a disk drive or other data storage device.

The magnetic domains of coating 852 of medium 850 are polarized or oriented so as to encode, in manner which may be conventional, a machine-executable program, for execution by a programming system such as a personal computer or other computer or similar system, having a socket or peripheral attachment into which the PLD to be programmed may be inserted, to configure appropriate portions of the PLD, including its specialized processing blocks, if any, in accordance with some embodiments.

FIG. 6B shows a cross section of an optically-readable data storage medium 810 which also can be encoded with such a machine-executable program, which can be carried out by systems such as the aforementioned personal computer, or other computer or similar device. Medium 810 can be a conventional compact disk read-only memory (CD-ROM) or digital video disk read-only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 810 preferably has a suitable substrate 811, which may be conventional, and a suitable coating 812, which may be conventional, usually on one or both sides of substrate 811.

In the case of a CD-based or DVD-based medium, as is well known, coating 812 is reflective and is impressed with a plurality of pits 813, arranged on one or more layers, to encode the machine-executable program. The arrangement of pits is read by reflecting laser light off the surface of coating 812. A protective coating 814, which preferably is substantially transparent, is provided on top of coating 812.

In the case of magneto-optical disk, as is well known, coating 812 has no pits 813, but has a plurality of magnetic domains whose polarity or orientation can be changed magnetically when heated above a certain temperature, as by a laser (not shown). The orientation of the domains can be read by measuring the polarization of laser light reflected from coating 812. The arrangement of the domains encodes the program as described above.

Figure 7:
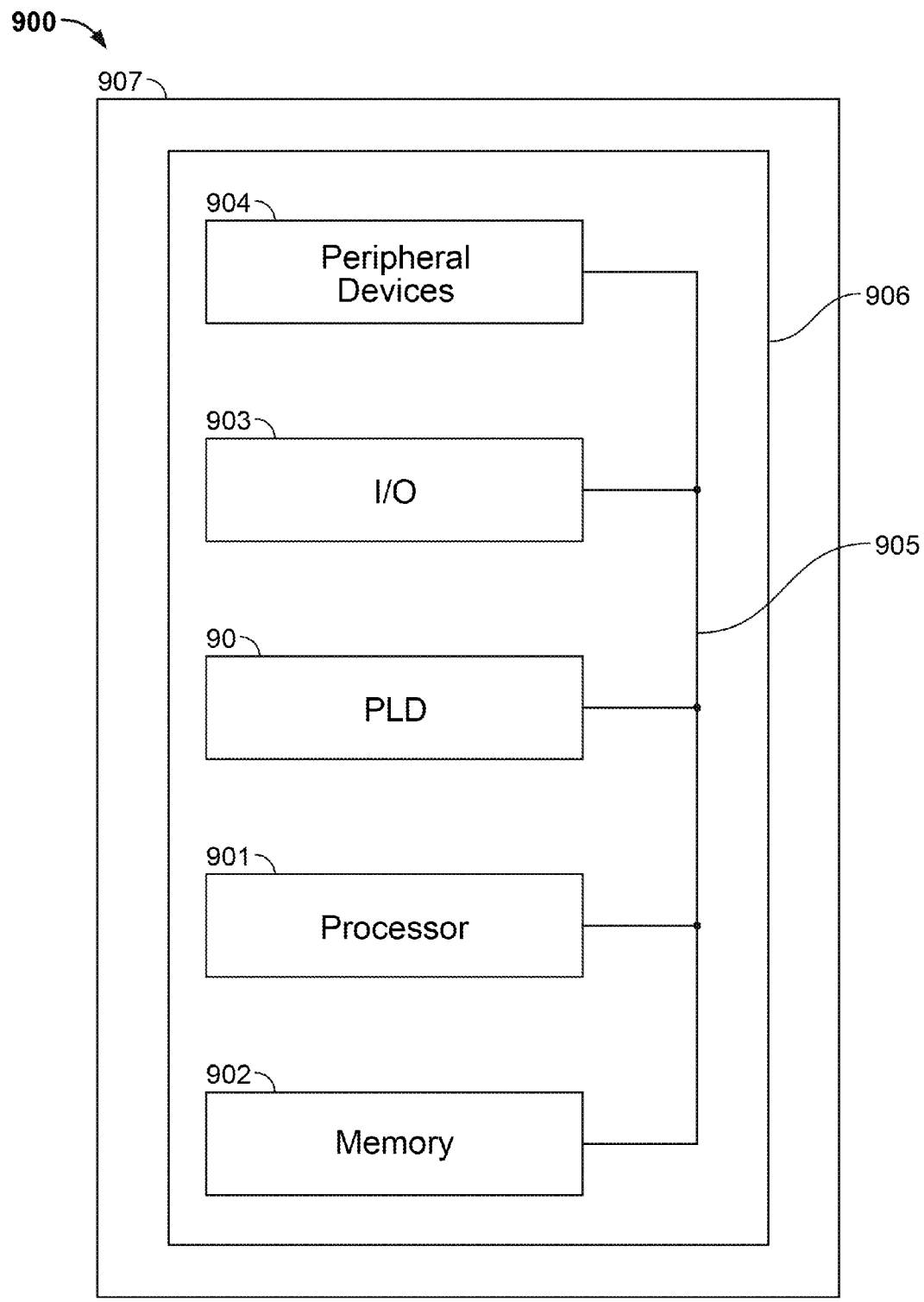
FIG. 7 is a simplified block diagram of an illustrative system employing a programmable logic device incorporating some embodiments.

A PLD 90 programmed according to some embodiments may be used in many kinds of electronic devices. One possible use is in a data processing system 900 shown in FIG. 7. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

System 900 can be used in a wide variety of applications, such as computer networking, data networking, instrumentation, video processing, digital signal processing, or any other application where the advantage of using programmable or reprogrammable logic is desirable. PLD 90 can be used to perform a variety of different logic functions. For example, PLD 90 can be configured as a processor or controller that works in cooperation with processor 901. PLD 90 may also be used as an arbiter for arbitrating access to a shared resources in system 900. In yet another example, PLD 90 can be configured as an interface between processor 901 and one of the other components in system 900. It should be noted that system 900 is only exemplary.

It will be understood that the foregoing is only illustrative, and that various modifications can be made by those skilled in the art without departing from the scope of the disclosure. For example, the various elements of this disclosure can be provided on a PLD in any desired number and/or arrangement. One skilled in the art will appreciate that the present disclosure can be practiced by other than the described embodiments, which are presented for purposes of illustration and not of limitation. In some of embodiments, some of the structures included with the embodiments described above, such as accumulator circuitry 215 of FIG. 2, or masking circuit 314 of FIG. 3, may not be included, but those embodiments would still be within the present disclosure.

What is claimed is:

1. Matrix operations circuitry comprising:
a multiplier circuit configured to selectively apply complex multiplication operations to input data for computing one of a conjugate dot product vector and a non-conjugate dot product vector; and
matrix memory coupled to the multiplier circuit, the matrix memory configured to store a composite matrix, wherein:
the conjugate dot product vector corresponds to a matrix decomposition operation for triangulating an input matrix to generate an element of a triangulated matrix,
the non-conjugate dot product vector corresponds to a forward substitution operation for determining an element of a forward substitution vector from the triangulated matrix,
the composite matrix comprises a first portion corresponding to the input matrix and a second portion corresponding to a product result matrix that is a product of the triangulated matrix and the forward substitution vector, and
the multiplier circuit is configured to process the first portion of the composite matrix to compute the conjugate dot product vector and the second portion of the composite matrix to compute the non-conjugate dot product vector.

2. The matrix operations circuitry of claim 1, wherein the multiplier circuit comprises:
a first input for receiving an operation selection signal; and
a second input for receiving a first input vector, wherein:
in response to the operation selection signal having a first polarity, the first input vector is a first vector of the triangulated matrix, and
in response to the operation selection signal having a second polarity, the first input vector is a portion of the forward substitution vector.

3. The matrix operations circuitry of claim 2, wherein the multiplier circuit further comprises a third input for receiving a second input vector corresponding to a second vector of the triangulated matrix, wherein:
the multiplier circuit computes the conjugate dot product vector by multiplying the first vector of the triangulated matrix and a conjugate of the second vector of the triangulated matrix; and
the multiplier circuit computes the non-conjugate dot product vector by multiplying the portion of the forward substitution vector and the second vector of the triangulated matrix.

4. The matrix operations circuitry of claim 3, further comprising a masking circuit having:
a first input port for receiving an output dot product vector from the multiplier circuit, the output dot product vector corresponding to the conjugate dot product vector or the non-conjugate dot product vector; and
a second input port for receiving a mask vector of mask values, wherein the masking circuit is configured to generate a masked dot product vector comprising a selectable portion of the output dot product vector and a selectable portion of the mask vector.

5. The matrix operations circuitry of claim 4, further comprising a dot product combiner coupled to the masking circuit and configured to sum respective elements of the output dot product vector to generate a dot product value.

6. The matrix operations circuitry of claim 5, further comprising subtracting circuitry configured to subtract the generated dot product value from a selectable one of an input element of the input matrix or a product result element of a product result matrix.

7. A method of configuring a programmable integrated circuit device as matrix operations circuitry, said method comprising:
configuring logic of said programmable integrated circuit device as a multiplier circuit that selectively applies complex multiplication operations to input data for computing one of a conjugate dot product vector and a non-conjugate dot product vector; and
configuring memory of said programmable integrated circuit device as matrix memory coupled to the multiplier circuit for storing a composite matrix, wherein:
the conjugate dot product vector corresponds to a matrix decomposition operation for triangulating an input matrix to generate an element of a triangulated matrix,
the non-conjugate dot product vector corresponds to a forward substitution operation for determining an element of a forward substitution vector from the triangulated matrix,
the composite matrix comprises a first portion corresponding to the input matrix and a second portion corresponding to a product result matrix that is a product of the triangulated matrix and the forward substitution vector, and
said configuring the logic of said programmable logic circuit device as the multiplier circuit comprises configuring the multiplier circuit to process the first portion of the composite matrix to compute the conjugate dot product vector and the second portion of the composite matrix to compute the non-conjugate dot product vector.

8. The method of claim 7, wherein said configuring the logic of said programmable logic circuit device as the multiplier circuit comprises configuring the multiplier circuit to have:
a first input for receiving an operation selection signal; and
a second input for receiving a first input vector, wherein:
in response to the operation selection signal having a first polarity, the first input vector is a first vector of the triangulated matrix, and
in response to the operation selection signal having a second polarity, the first input vector is a portion of the forward substitution vector.

9. The method of claim 8, wherein said configuring the logic of said programmable logic circuit device as the multiplier circuit comprises configuring the multiplier circuit to have a third input for receiving a second input vector corresponding to a second vector of the triangulated matrix, wherein:
the multiplier circuit computes the conjugate dot product vector by multiplying the first vector of the triangulated matrix and a conjugate of the second vector of the triangulated matrix; and the multiplier circuit computes the non-conjugate dot product vector by multiplying the portion of the forward substitution vector and the second vector of the triangulated matrix.

10. The method of claim 9, further comprising configuring logic of said programmable logic circuit device as a masking circuit having:
a first input port for receiving an output dot product vector from the multiplier circuit, the output dot product vector corresponding to the conjugate dot product vector or the non-conjugate dot product vector; and
a second input port for receiving a mask vector of mask values, wherein the masking circuit is configured to generate a masked dot product vector comprising a selectable portion of the output dot product vector and a selectable portion of the mask vector.

11. The method of claim 10, further comprising configuring logic of said programmable logic circuit device as a dot product combiner coupled to the masking circuit for summing respective elements of the output dot product vector to generate a dot product value.

12. The method of claim 11, further comprising configuring logic of said programmable logic circuit device as subtracting circuitry for subtracting the generated dot product value from a selectable one of an input element of the input matrix or a product result element of a product result matrix.

13. A non-transitory machine-readable data storage medium encoded with machine-executable instructions for configuring a programmable integrated circuit device as matrix operations circuitry, said instructions comprising:
instructions to configure logic of said programmable integrated circuit device as a multiplier circuit that selectively applies complex multiplication operations to input data for computing one of a conjugate dot product vector and a non-conjugate dot product vector; and
instructions to configure memory of said programmable integrated circuit device as matrix memory coupled to the multiplier circuit for storing a composite matrix, wherein:
the conjugate dot product vector corresponds to a matrix decomposition operation for triangulating an input matrix to generate an element of a triangulated matrix,
the non-conjugate dot product vector corresponds to a forward substitution operation for determining an element of a forward substitution vector from the triangulated matrix,
the composite matrix comprises a first portion corresponding to the input matrix and a second portion corresponding to a product result matrix that is a product of the triangulated matrix and the forward substitution vector, and
said instructions to configure the logic of said programmable logic circuit device as the multiplier circuit comprise instructions to configure the multiplier circuit to process the first portion of the composite matrix to compute the conjugate dot product vector and the second portion of the composite matrix to compute the non-conjugate dot product vector.

14. The non-transitory machine-readable data storage medium of claim 13, wherein said instructions to configure the logic of said programmable logic circuit device as the multiplier circuit comprise instructions to configure the multiplier circuit to have:
a first input for receiving an operation selection signal; and
a second input for receiving a first input vector, wherein:
in response to the operation selection signal having a first polarity, the first input vector is a first vector of the triangulated matrix, and
in response to the operation selection signal having a second polarity, the first input vector is a portion of the forward substitution vector.

15. The non-transitory machine-readable data storage medium of claim 14, wherein said instructions to configure the logic of said programmable logic circuit device as the multiplier circuit comprise instructions to configure the multiplier circuit to have a third input for receiving a second input vector corresponding to a second vector of the triangulated matrix, wherein:
the multiplier circuit computes the conjugate dot product vector by multiplying the first vector of the triangulated matrix and a conjugate of the second vector of the triangulated matrix; and
the multiplier circuit computes the non-conjugate dot product vector by multiplying the portion of the forward substitution vector and the second vector of the triangulated matrix.

16. The non-transitory machine-readable data storage medium of claim 15, wherein said instructions further comprise instructions to configure logic of said programmable logic circuit device as a masking circuit having:
a first input port for receiving an output dot product vector from the multiplier circuit, the output dot product vector corresponding to the conjugate dot product vector or the non-conjugate dot product vector; and
a second input port for receiving a mask vector of mask values, wherein the masking circuit is configured to generate a masked dot product vector comprising a selectable portion of the output dot product vector and a selectable portion of the mask vector.

17. The non-transitory machine-readable data storage medium of claim 16, wherein said instructions further comprise instructions to configure logic of said programmable logic circuit device as a dot product combiner coupled to the masking circuit for summing respective elements of the output dot product vector to generate a dot product value.

18. The non-transitory machine-readable data storage medium of claim 15, wherein said instructions further comprise instructions to configure logic of said programmable logic circuit device as subtracting circuitry for subtracting the generated dot product value from a selectable one of an input element of the input matrix or a product result element of a product result matrix.

* * * * *